(12) United States Patent
Wolf et al.

(10) Patent No.: US 6,435,723 B1
(45) Date of Patent: Aug. 20, 2002

(54) SPLIT BEARING ARRANGEMENT AND METHOD OF MAKING SAME

(75) Inventors: Johann Wolf, Ottobrunn (DE); Rudolf Wimmer, Haidershofen; Andrea Dipl.-Ing. Keber, Steyer, both of (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/674,285

(22) PCT Filed: Apr. 12, 1999

(86) PCT No.: PCT/EP99/02442
  § 371 (c)(1),
  (2), (4) Date: Dec. 29, 2000

(87) PCT Pub. No.: WO99/56027
  PCT Pub. Date: Nov. 4, 1999

(30) Foreign Application Priority Data

Apr. 29, 1998 (DE) .......................................... 198 19 080

(51) Int. Cl.$^7$ ................................................. F16C 9/02
(52) U.S. Cl. .......................................... 384/434; 29/898
(58) Field of Search ................................ 384/294, 429, 384/430, 432, 433, 434; 29/898.07, 898.09, 898; 74/579 R; 123/195 R

(56) References Cited

U.S. PATENT DOCUMENTS

| | | | | | |
|---|---|---|---|---|---|
| 3,046,953 A | * | 7/1962 | Dolza | ..................... | 123/195 R |
| 3,411,378 A | * | 11/1968 | Borgeaud | ................. | 74/579 R |
| 3,520,045 A | * | 7/1970 | Kuhn | ...................... | 29/898.07 |
| 3,818,577 A | * | 6/1974 | Bailey et al. | ............. | 219/121.2 |
| 4,037,888 A | * | 7/1977 | Mirjanic | ...................... | 384/434 |
| 4,093,322 A | | 6/1978 | Koskuba | | |
| 4,189,193 A | * | 2/1980 | Schumacher | ................. | 384/434 |
| 5,722,036 A | * | 2/1998 | Shikata et al. | ............ | 74/579 R |

FOREIGN PATENT DOCUMENTS

| | | |
|---|---|---|
| DE | 68 12 460 | 4/1969 |
| DE | 26 44 815 | 4/1977 |
| DE | 43 02 303 | 8/1994 |
| DE | 43 32 444 | 3/1995 |
| DE | 43 33 658 | 4/1995 |
| DE | 44 36 803 | 4/1996 |
| DE | 195 35 497 | 3/1997 |
| DE | 196 45 691 | 5/1998 |
| DE | 196 47 465 | 5/1998 |
| FR | 1 162 407 | 9/1958 |

OTHER PUBLICATIONS

Arndt et al., "Das Aluminium–Kurbelgehäuse der Audi–Vierzylindermotoren mit 1,6 und 1,8 Hubraum", MTZ Motortechnische Zeitschrift 58 (1997) pp. 600–606.

Schaede et al., "Entwicklung Elektrisch–thermischer Abtragverfahren in Deutschland", Werkstatt und Betrieb 124 (1991) pp. 379–383.

* cited by examiner

Primary Examiner—Thomas R. Hannon
(74) Attorney, Agent, or Firm—Crowell & Moring LLP

(57) ABSTRACT

For a machine housing with a split bearing arrangement, particularly journal bearing in piston machines, with a bearing cover clampably arranged via corresponding profiles on a bearing block, it is proposed that a bearing cover having a profile in its clamping face and acting as the tool electrode be used to produce by an electrical discharge machining process a corresponding profile in the clamping face of the bearing block of the machine housing serving as the workpiece electrode in order to achieve an advantageous formation of the profile. After the electrical discharge machining process, the bearing cover is mounted to the bearing block.

13 Claims, 2 Drawing Sheets

SPLIT BEARING ARRANGEMENT AND METHOD OF MAKING SAME

BACKGROUND AND SUMMARY OF THE INVENTION

The invention, relates to a machine housing with a split bearing arrangement, particularly a journal bearing in piston machines, with a bearing cover clampably arranged on a bearing block, with the two being connected with one another with respect to their clamping faces at least in partial areas via corresponding profiles in a form-fit connection.

For the exactly positioned assignment of bearing cover and bearing block, it is known in the art to fix the bearing cover in relation to the bearing block by means of alignment pins, alignment sleeves, or alignment collars on the bearing cover screws. For high transverse loads, the bearing cover may in addition be fit tightly within the machine housing or on the bearing block. To absorb high transverse loads, it is furthermore known to provide the two clamping faces of bearing block and bearing cover with corresponding tooth profiles, as proposed, for example, in generic German utility model DE-U 68 12 460.

Such profiles have the drawback of being costly due to their production by chip-removing machining.

Furthermore, FR-A 1 162 407 proposes, for the cost-effective production of the clamping faces of two parts that are connected by means of screws and are to be positioned with high precision, to produce the clamping faces by electrical discharge machining with one of the parts serving as tool electrode. This known process produces corresponding rough surfaces.

The object of the invention is to define a procedure for a more advantageous forming of a profile for a generic machine housing using electrical discharge machining.

The invention advantageously makes it possible to perfectly shape an exact form-fit profile in bearing block and bearing cover, in similar as well as in dissimilar materials, particularly in a bearing cover made of an iron material. Cutting edge-like projections or pyramid-type points above triangular or rectangular bases produced by chip removing machining serve as generating profiles.

Another further development of the invention discloses by means of electrical discharge machining, a tool electrode having a profile of the clamping face which is used to form a corresponding profile in the clamping face of the bearing block of the machine housing, which serves as the workpiece electrode, such that by means of electrical discharge machining an eroded rough surface with a roughness Ra of approx. 50 µm–300 µm is produced in associated clamping faces of bearing cover and bearing block, each made of an aluminum alloy and spaced at a distance from the other corresponding to the machining process, with a fracture surface-like tooth profile being achieved by means of hard freestanding inclusions in the clamping faces of bearing block and bearing cover, which form corresponding indentations in the respective opposite face.

DE 43 32 444 A1 discloses a bearing arrangement split by fracture separation with a molded body formed from a ceramic material in a light metal cast alloy, wherein the molded body, to achieve fracture surfaces with a distinct mutually meshing form when reassembled, additionally contains freestanding ceramic particles. The use of these particles as "auxiliary electrodes" not only advantageously accelerates the machining process, but also achieves a better form closure of the two clamping faces.

The above-described further development of the invention makes it possible to achieve a fracture surface-like tooth profile in the clamping faces without the high loads required in fracture separation that cause a disadvantageous deformation of the respective workpiece.

This advantageous further development is used, in particular, for a crankshaft bearing frame of a V-engine, wherein the machine housing and the bearing frame are each made of an aluminum alloy.

BRIEF DESCRIPTION OF THE DRAWINGS

The invention will now be described in greater detail, by way of example, with reference to the drawing in which.

DETAILED DESCRIPTION OF THE DRAWINGS

Figure 1:
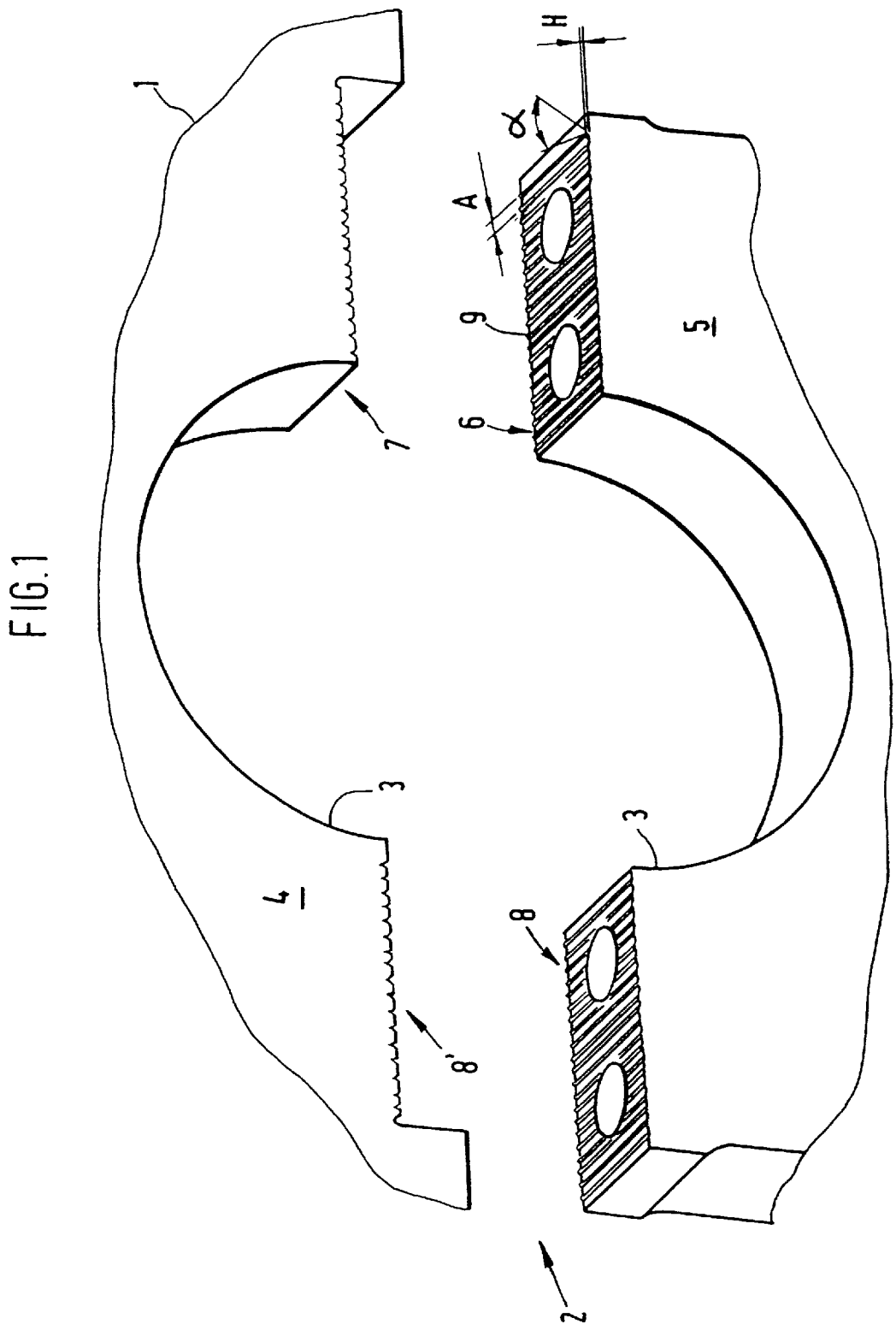
FIG. 1 shows a bearing arrangement with a bearing cover depicted separately from the bearing block, which cover has a profile whose corresponding profile in the clamping face of the bearing block is to be produced by electrical discharge machining.
Figure 2:
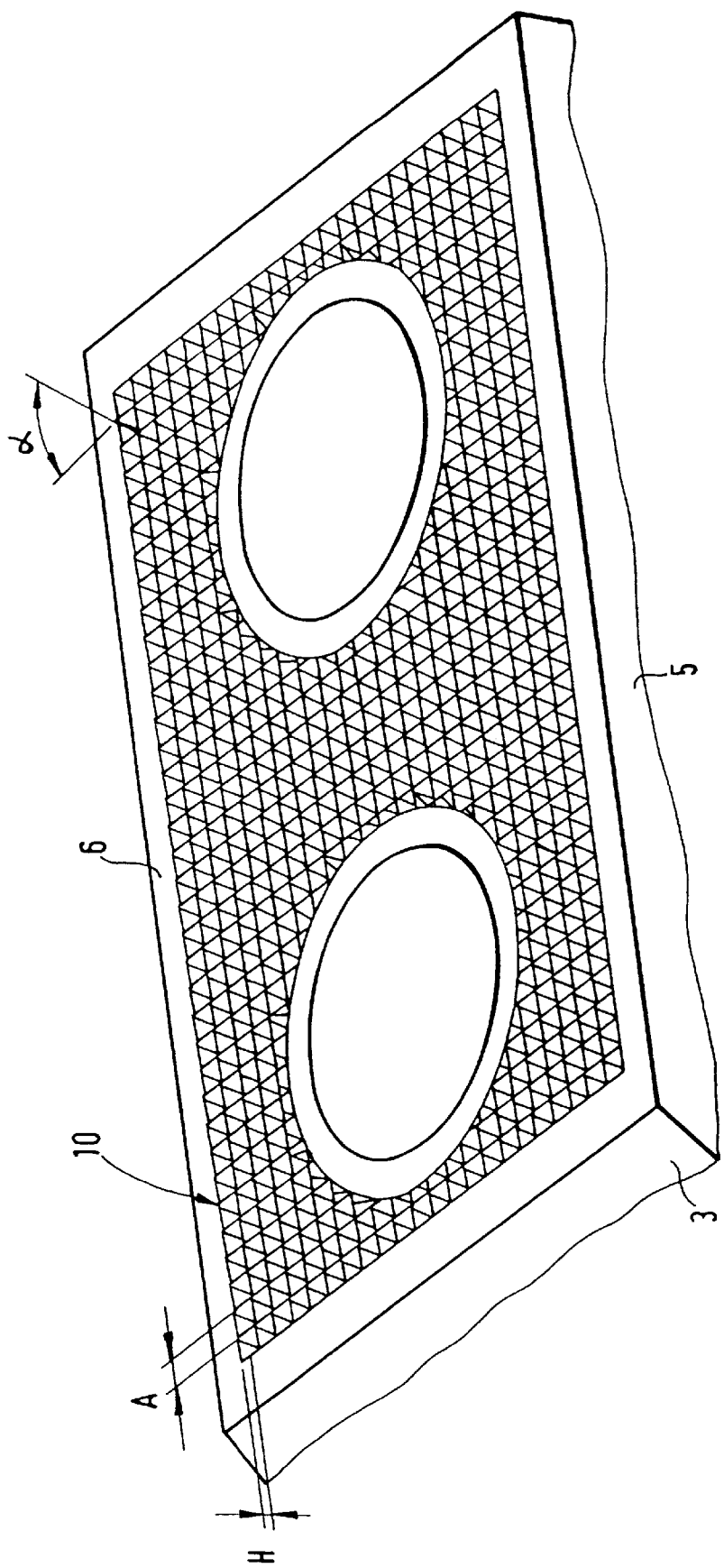
FIG. 2 shows a profile with pyramid-type points, which differs from the profile with cutting edge-like projections depicted in FIG. 1.

A machine housing 1 with a split bearing arrangement 2, preferably a crankshaft journal bearing 3 in a piston internal combustion machine (not depicted), comprises a bearing block 4 with clampably arranged bearing cover 5, wherein the two are connected with one another with respect to their clamping faces 6, 7 at least in partial areas via corresponding profiles 8, 8' in a form-fit connection.

To achieve a favorable embodiment of the profiles 8, 8', a bearing cover 5 having a profile 8 in its clamping face 6 and acting as the tool electrode is used to produce by means of an electrical discharge machining process a corresponding profile 8' in the clamping face 7 of the bearing block 4 of the machine housing 1 serving as the workpiece electrode. After completion of the electrical discharge machining process, the bearing cover 5 is then mounted to the bearing block 4.

Preferably cutting edge-like projections 9 or pyramid-type points 10 are provided as profile 8 above triangular or rectangular bases.

For a machine housing 1, made particularly of an aluminum alloy, for a V-internal combustion engine, the projections 9 or points 10 are formed by chip-removing machining on a bearing cover 5 made of an iron material. The projections 9 have an edge angle α, or the points 10 a cone angle α, of 50°–110°, respectively, with an edge or point height "H" of 0.25 mm–1.5 mm. The edge distance "A" between the projections 9, or distance "A" between the points 10, measures between 0.5 mm–3.0 mm, respectively.

The above-described profile embodiment or profile design according to the invention achieves a form-fit connection of bearing cover 5 and bearing block 4 that can be subjected to high loads and is free from damaging micromovements, particularly under the high loads in V-engines.

According to another further development of the invention, the aforementioned aim is also achieved in that an eroded rough surface with a roughness Ra of approximately 50 µm–300 µm is produced in the associated clamping faces of bearing cover 5 and bearing block 4, which are spaced at a distance from one another corresponding to an electrical discharge-machining process. A fracture surface-like tooth profile (not shown) is achieved by means of hard, freestanding or protruding inclusions (crystals) in the clamping faces of bearing block 4 and bearing cover 5 made of similar materials (aluminum alloys), which form corresponding indentations in the respective opposite face 6, 7.

This profile embodiment is preferably used for a crankshaft bearing frame of a V-engine or internal combustion machine wherein the machine housing 1 and the bearing frame (not depicted) are each made of an aluminum alloy. The aluminum alloys used, in particular, are those in which relatively large and hard crystals are embedded.

The invention is aimed at the use of an electrical discharge machining process for shaping form-fit clamping faces between bearing cover and bearing block of a split bearing arrangement in a machine housing. The use of the bearing cover as the tool electrode per se can be derived from DE-A 44 36 803, which discloses an external gear as electrode to produce an internal gear workpiece by means of electrical discharge machining.

What is claimed is:

1. Machine housing with a split bearing arrangement, comprising:

a bearing cover clampably arranged on a bearing block, and connected with one another at respective clamping faces at least in partial areas via corresponding profiles in a form-fit connection;

wherein the bearing cover forms a tool electrode for facilitating an electrical discharge machining process to form the corresponding profile in the clamping face of the bearing block, the bearing block serving as a workpiece electrode;

wherein one of cutting edge-like projections and pyramid-type points above one of triangular and rectangular bases are provided as the generating profiles in the bearing cover;

wherein the one of projections and points are produced by chip-removing machining and have one of a blade and cone angle, α, of 50° to 110°, respectively, and one of a blade and point height, H, of 0.25 mm to 1.5 mm, and wherein one of a cutting edge distance, A, between the projections, and a distance, A, between the points, being 0.5 mm to 3.0 mm, respectively.

2. Machine housing as claimed in claim 1, wherein the one of projections and points are formed on a bearing cover made of an iron material for a machine housing made of light metal, and the bearing cover, which serves as the tool electrode, is mounted to the bearing block after the electrical discharge machining process.

3. Machine housing with a split bearing arrangement comprising:

a bearing cover, clampably arranged on a bearing block, and connected with one another at respective clamping faces at least in partial areas via corresponding profiles in a form-fit connection, wherein the bearing cover forms a tool electrode for facilitating an electrical discharge machining process to form the corresponding profile in the clamping face of the bearing block, the bearing block serving as a workpiece electrode;

such that by means of the electrical discharge machining process, an eroded rough surface with a roughness Ra of approximately 50 $\mu$m to 300 $\mu$m is produced in the clamping faces of the bearing cover and the bearing block, each of the bearing cover and the bearing block being made of an aluminum alloy;

wherein a fracture surface-like tooth profile is produced by means of hard, freestanding inclusions in the clamping faces of bearing block and bearing cover, which form corresponding indentations in the respective opposite clamping face.

4. Machine housing as claimed in claim 3, used for a crankshaft bearing frame of a V-engine, wherein the machine housing and the bearing frame are each made of an aluminum alloy with embedded hard crystals.

5. A method of forming a split bearing arrangement for use in a machine housing comprising:

providing a bearing cover including a clamping face having a corresponding profile, wherein the profile in the bearing cover is formed by one of cutting edge-like projections and pyramid-type points formed above one of triangular and rectangular bases;

providing a bearing block including a clamping face;

clamping the bearing cover to the bearing block along the respective clamping faces; and performing an electrical discharge machining process by utilizing the bearing cover as a tool electrode to produce a corresponding profile in the clamping face of the bearing block which serves as a workpiece electrode.

6. The method of claim 5, wherein the one of projections and points have a blade or cone angle α of 50° or 110°.

7. The method of claim 5, wherein the one of projections and points have a blade or point height H of 0.25 mm to 1.5 mm.

8. The method of claim 5, wherein the one of projections and points are produced by chip-removing machining.

9. The method of claim 5, wherein one of a cutting edge distance and a distance between the points, A, is 0.5 mm to 3.0 mm.

10. The method of claim 5, wherein the one of projections and points are formed on a bearing cover made from iron and the machine housing is made of a light metal.

11. The method of claim 5, further including mounting the bearing cover to the housing block after performing the electrical discharge machining process.

12. A method of forming a split bearing arrangement for use in a machine housing comprising:

providing a bearing cover including a clamping face having a corresponding profile and hard, freestanding inclusions, the bearing cover being made from aluminum alloy;

providing a bearing block including a clamping face having hard, freestanding inclusions, the bearing block being made from aluminum alloy;

clamping the bearing cover to the bearing block along the respective clamping faces;

performing an electrical discharge machining process by utilizing the bearing cover as a tool electrode and the bearing block as a workpiece electrode, to produce a corresponding fracture surface-like tooth profile in the clamping face of the bearing block and to produce an eroded rough surface having a roughness Ra of approximately 50 $\mu$m to 300 $\mu$m and corresponding indentations on the clamping faces of the bearing cover and the bearing block.

13. The method of claim 12, wherein the machine housing and the bearing frame are made of an aluminum alloy with embedded hard crystals.

* * * * *